Oct. 28, 1952     A. M. YOUNG ET AL     2,615,657
HELICOPTER ENGINE-ROTOR SUPPORT
Filed Aug. 28, 1946     2 SHEETS—SHEET 1
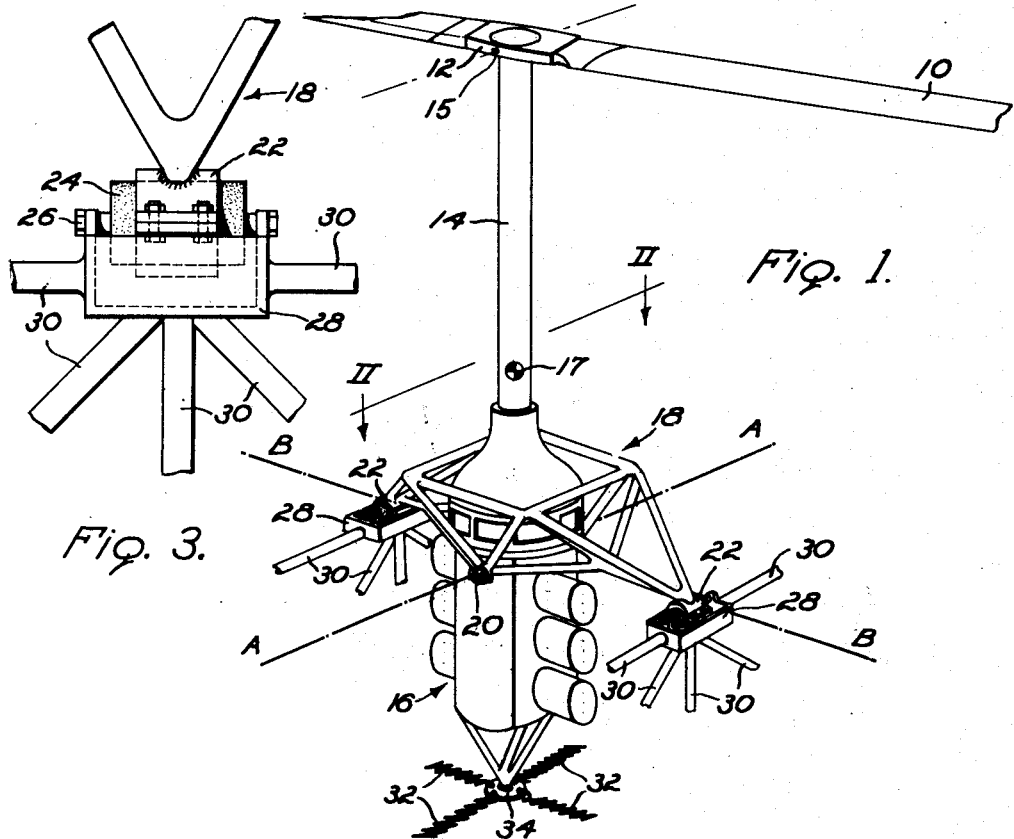
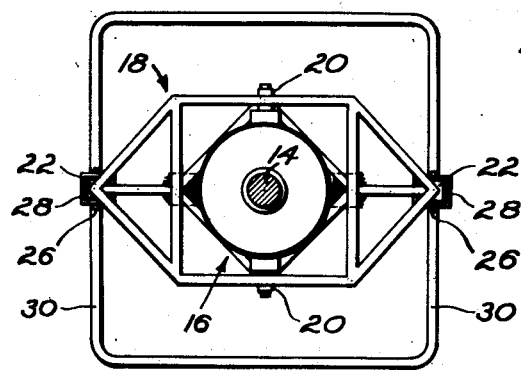
INVENTOR
Arthur M. Young &
BY Bertram Kelley
ATTORNEYS

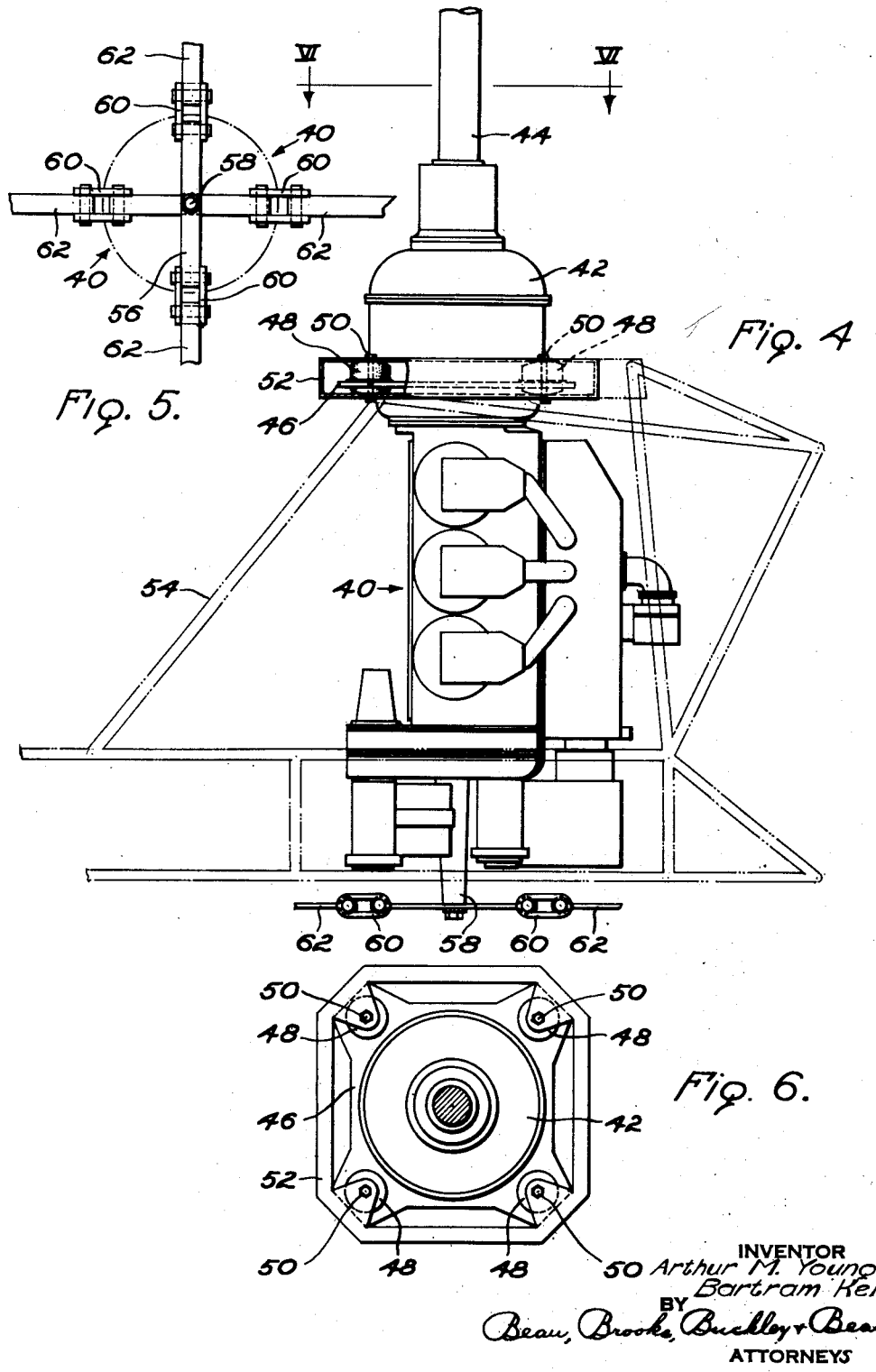

Patented Oct. 28, 1952

2,615,657

UNITED STATES PATENT OFFICE 2,615,657

HELICOPTER ENGINE-ROTOR SUPPORT

Arthur M. Young and Bartram Kelley, Buffalo, N. Y., assignors to Bell Aircraft Corporation, Wheatfield, N. Y.

Application August 28, 1946, Serial No. 693,484

4 Claims. (Cl. 244—17.27)

This invention relates to rotary wing aircraft, and more particularly to an improved rotor and engine mounting arrangement in such aircraft.

In rotary wing aircraft it is usually necessary to support the lifting rotor means at an appreciable distance from the aircraft fuselage or other body portion, and therefore such rotor devices comprise rotating vibratory masses which may be supported either by cantilever or truss structures. Also, in the case of conventional aircraft wherein a propeller may be located at an appreciable distance from the supporting fuselage or wing or body, the propeller similarly comprises a rotating vibratory mass supported at a distance from the aircraft frame. Thus, the absorption of the vibrations of the rotating engine and/or drive extension and/or the driven rotor or propeller has presented difficult problems in vibration absorption.

One of the objects of the invention is to provide in an aircraft a rotor or propeller and driving element therefor arranged in the form of a vibrationally integral unit suspended relative to the aircraft frame so that the focal point around which the unit is pivoted to rock coincides substantially with the center about which the unit would naturally rock under application of vibratory forces laterally against the rotor-propeller hub.

One of the objects of the invention is to provide a rotary wing aircraft having the rotative wing and driving engine elements thereof arranged in the form of a vibrationally integral unit so that the rotor and engine elements are relatively positionally fixed; the rotor engine unit being suspended in the aircraft fuselage so as to be somewhat free to rock therein in two planes as in response to disturbances from either aerodynamic forces externally thereof or from unbalance in the rotor, except as such rocking is restrained by spring means and/or limited by stop devices to regulate the frequencies and/or amplitudes of such rockings.

Another object of the invention is to provide a rotary wing aircraft rotor-engine unit mounting arrangement as set forth hereinabove, the mounting arrangement being also adapted to resist the torque of the rotor and to prevent rotation of the engine unit relative to the fuselage.

Another object of the invention is to provide in a rotor-engine mounting unit as set forth hereinabove a system of elastic restraint devices to control the movements of the rotor-engine unit relative to the fuselage so as to time the frequencies of such movements to be under the operating R. P. M. of the rotor.

Another object of the invention is to provide a rotor-engine unit mounting arrangement as set forth hereinabove, which incorporates stop devices for preventing oscillations of the rotor-engine unit at excessive amplitudes relative to the fuselage.

Another object of the invention is to provide a rotor-engine unit supporting arrangement as set forth hereinabove, wherein the focal point around which the rotor-engine unit is pivoted to rock coincides substantially with the center about which the unit would naturally rock under the application of vibratory forces to the hub. Thus, external horizontally directed forces acting upon the rotor will cause the rotor-engine unit to rock about its pivot center in pure rotation and with a minimum of horizontal thrusts on the pivoting structure.

Another object of the invention is to provide a rotor-engine unit support arrangement as recited hereinabove wherein the horizontally directed forces acting against the rotor are transformed into pure rotation of the rotor-engine unit with substantial elimination of horizontal forces against the pivoting structure; said rotational motion being in turn restrained by soft rubber or like devices to effect maximum isolation of forces from the fuselage.

Another object of the invention is to provide in rotative wing aircraft an improved rotor-engine unit mounting arrangement whereby a smoother operation of the rotor is effected.

Other objects and advantages of the invention will appear from the specification hereinafter.

The invention contemplates that whereas in prior rotative wing aircraft engine and rotor mounting arrangements the rotor-engine units are usually arranged so as to rock about a point substantially coincident with the center of gravity of the rotor-engine unit, such prior art arrangements induce undesirable vibration results. The invention further contemplates that such disadvantages and difficulties of the prior art may be prevented by suspending the rotor-engine unit so that it is pivoted to rock about that point which is the natural center of rotation for which the rotor hub is the center of applied vibratory force. In this connection it may be explained that whereas conventional aircraft engines have previously been mounted to rock about their centers of gravity, about axes generally perpendicular to the shaft axis, this is efficacious only when the sources of vibration are largely inside the engine. However, in the case of rotary wing aircraft, or conventional aircraft having large propellers, or in any case where disturbances arise due to propeller unbalance or aerodynamic or gyroscopic forces on the propeller, the system of rotor or propeller and shaft or pylon, with or without integral engine, will naturally tend to rock not about its center of gravity, but about some other point. It is an object of this invention to provide a simple mount such that the said system is allowed to rotate or rock about this natural point, said rotation or rocking being elastically restrained with or without damping.

The location of the proper pivot point can be calculated by well-known methods, and depends on the dimensions and masses and stiffnesses of the system, and frequency of vibratory force applied to the rotor or propeller. The application need not be confined to aircraft, but might apply to the propeller of a boat, or any vibrating or rotating mass supported on a shaft or on a non-rotating pylon. This invention is particularly applicable to aircraft in which the propeller normally turns at reasonably constant speed, and hence the vibrations to be eliminated from the supporting structure have a reasonably constant frequency.

Therefore, the present invention contemplates a novel rotor-engine unit mounting arrangement which is specifically adapted to rotary-wing and/or other aircraft, and/or boats, and is described for example in the following specification and illustrated in the following drawings, wherein:

Fig. 1 is a fragmentary perspective of a helicopter rotor-engine unit and mounting arrangement of the invention;

Fig. 2 is a section as along line II—II of Fig. 1;

Fig. 3 is an enlarged side elevational view of a mounting connection portion thereof;

Fig. 4 is a side elevation of another form of the rotor-engine mounting arrangement;

Fig. 5 is a bottom plan of the arrangement of Fig. 4; and

Fig. 6 is a section as along line VI—VI of Fig. 4.

The present invention comprises essentially the resilient support of the mast, pylon, or other cantilevered strut-like structure carrying the rotative components by means of resilient mounting units which serve to increase the flexibility of the propeller or rotor hub in a plane parallel to the disc of rotation of the propeller or rotor. The supporting system preferably includes the cantilevered support of the vibratory mass at one terminal of the strut, a flexible support permitting limited rocking movement at the other terminal and resilient supporting units intermediate the terminals. The system may also be considered to consist of engine, shaft, and rotor or propeller, in which the engine and shaft comprise the strut-like structure aforementioned; and the invention consists in the method of supporting such strut-like structure of such engine-shaft system.

In Figs. 1-3, the invention is illustrated in conjunction with a helicopter dual bladed rotor 10 having its hub portion 12 pivotably connected to the upper end of the rotor shaft 14, as by means of a pivot device indicated at 15. The shaft 14 constitutes a driving extension of the crank shaft of an engine which is indicated generally at 16; the rotor drive shaft being positionally fixed with respect to the engine casing while being free to rotate to drive the rotor. Thus, the engine; the rotor shaft; and the rotor constitute an integral unit having a center of gravity approximately at 17, but in accord with the concept of the present invention this unit is mounted upon the aircraft fuselage by means of rubber mounting connections which are so positioned that the engine-shaft-rotor unit may rock relative to the fuselage about a point which may be defined as the point about which the unit tends to rotate when the upper end of the rotor shaft is subjected to a force in any sidewise direction. This point is termed the "center of rocking" and is along the axis of the rotor shaft but below the center of gravity of the engine-shaft-rotor unit.

One method for determining the location of the point would be to apply the formula:

$$b = \frac{I\omega^2 - k_\theta}{aM\omega^2}$$

wherein:

$I$ = moment of inertia of the whole system about its center of gravity $M$ = mass of the whole system $k_\theta$ = elastic restoring torque which resists rocking of the system $\omega$ = angular velocity of applied forced vibration at rotor or propeller hub $a$ = distance from hub to center of gravity of system $b$ = distance from center of gravity to point of natural pivoting or rocking, measured in a direction away from the hub.

It will be noticed that if the rocking motion is not restrained, $k_\theta$ is zero, and the above formula reduces to the well-known relationship between axis of rotation and center of percussion.

As illustrated in Figs. 1-3, the engine mount arrangement may comprise a truss designated generally at 18 which embraces the engine 16 and is pivotally connected thereto by means of opposed bearings 20—20 (Fig. 2) which are axially aligned as indicated at AA. The truss 18 includes a pair of laterally extending arm portions terminating in sleeves 22—22 which in turn encircle rubber bushings 24—24 carried by central pins 26—26 upon bearing blocks 28 which are fixedly mounted upon aircraft fuselage elements 30. The bearings 22—22 are arranged to be centered upon an horizontal axis BB which intersects the axis AA at right angles, and thus it will be understood that the engine-shaft-rotor unit may rock about the axis AA and about the axis BB to a limited degree, whereby the engine-shaft-rotor unit is free to rock in any direction about a point located at the intersection of the rotor shaft axis with the plane of axes AA—BB. As stated hereinabove, the mounting connections 20—22 will be positioned as to dispose the plane of the axes AA—BB to be substantially at the elevation of the center of percussion of the engine-shaft-rotor unit. The rubber bushings 24 are installed in this particular application in order to isolate torquewise vibrations of engine and shaft, and have no direct bearing on the invention except insofar as they allow slight horizontal motion of the pivot point in one direction. The elastic restoring force for restricting the motion about the pivot and maintaining the unit in substantially vertical position is supplied as illustrated in Fig. 1 to comprise tension springs 32 extending radially and at right angles to each other from a central connection device 34 which is fixed to the bottom end of the engine casing; the outer ends of the springs 32 being connected to stationary portions of the aircraft fuselage (not shown) so as to impose elastic restraint against rocking of the engine-shaft-rotor unit in the fuselage. The characteristics of springs 32 may be varied or "tuned" to suit unsymmetrical conditions, and/or different frequencies of vibrations until the best combination for all flight conditions is found.

Figs. 4-6 illustrate another form of engine mounting structure embodying the features of the invention, and in this case the engine is designated generally at 40 and is illustrated to include a driving gear case 42 from which the rotor drive shaft protrudes as at 44. The engine case 42 carries integrally therewith (Fig. 6) a horizontally disposed spider 46 which terminates in radially extending ends which are perforated to mount therein rubber bushings 48 which carry central pins 50 for anchoring the bushings between opposed flange portions of a frame 52 which is an integral portion of the aircraft structure 54. Thus, the bushings 48 at different points about the spider 46 are arranged to elastically deform under compression loads so as to permit the engine-transmission-rotor shaft unit to rock about a center located at approximately the plane of the spider 46, relative to the aircraft frame 52—54; and as explained hereinabove, the spider-frame unit 46—52 will be located at approximately the elevation of the position of the point about which the engine-shaft-rotor unit would tend to rotate if it were unmounted and subjected to a side wind force against the rotor, or the like. Preferably, as in the case of Figs. 1-3 the arrangement of Figs. 4-6 will also include a rocking restraining means such as a spider 56 having arms extending radially from a central point of connection to a horn 58 (Fig. 4) which is an integral extension of the engine crank case at the bottom end thereof. The arms of the spider 56 connect to corresponding bungee rings 60 which in turn are linked to brackets 62 constituting extensions from the aircraft frame. It will of course be understood that any other suitable elastic restraining means may be arranged to interconnect the aircraft frame and the engine-shaft-rotor unit at some position thereon spaced away from the plane of the center of rotation of the unit, as defined hereinabove.

Also, it will be understood that although only two specific forms of mechanism for practicing the invention have been illustrated and described in detail hereinabove, the invention is not so limited and that various changes may be made therein without departing from the spirit of the invention and the scope of the appended claims.

What is claimed is:

1. In a helicopter aircraft having a body frame, a power unit including an engine and a shaft extending therefrom and a helicopter rotor carried by said shaft exteriorly of said frame, said unit having a center about which said unit would tend to rotate if free of restraint when under the impact of a force directed laterally against said rotor, means universally mounting said unit in said frame to hold it and to guide it to rock universally as a unit within limits about a point coinciding substantially with said center, said means comprising a universal pivoting means for connecting said unit to said aircraft, said pivoting means having its center of universal pivoting substantially coinciding with said center about which said unit would tend to rotate, and resilient means connected to said unit at a point spaced from said center for elastically restraining rocking of said unit relative to said body frame.

2. In a helicopter aircraft having a body frame, a power unit including an engine and a shaft extending therefrom, and a helicopter rotor carried by the upper end of said shaft exteriorly of said frame, said unit having a center about which said unit would tend to rotate if free in space when under the impact of a force directed laterally against said rotor, means universally mounting said unit in said frame to hold it and to guide it to rock universally as a unit within limits relative to said frame about a point coinciding substantially with said center, said means comprising a universal pivoting means for connecting said unit to said aircraft frame, said pivoting means having its center of universal pivoting substantially coinciding with said center about which said unit would tend to rotate, and resilient means connected to said body frame and to said unit below said center for elastically restraining rocking of said unit relative to said body frame.

3. In a helicopter aircraft having a body, a power unit including an engine and a shaft extending therefrom, and a helicopter rotor carried by said shaft exteriorly of said body, said unit having a center about which said unit would tend to rotate if free from restraint when under the impact of vibratory air forces directed laterally against said rotor, means universally mounting said unit in said body to hold it and to guide it to rock universally as a unit within limits about a point coinciding substantially with said center, said means comprising a universal pivoting means connecting said unit to said aircraft, said pivoting means having its center of universal pivoting substantially coinciding with said center about which said unit would tend to rotate, and means for elastically restraining rocking of said unit relative to said body.

4. In a helicopter aircraft having a body frame, a power unit including an engine and a shaft extending therefrom, and a helicopter rotor carried by said shaft exteriorly of said frame, said unit having a center of rotation about which said unit would tend to rotate if unrestrained responsive to vibratory air forces directed laterally against said rotor, means universally mounting said unit in said frame to hold it and to guide it to rock universally as a unit about a point coinciding substantially with said center of rotation, said means comprising a universal pivoting means for connecting said unit to said aircraft, said pivoting means having its center of universal pivoting substantially coinciding with said center of rotation about which said unit would tend to rotate, and centering means connected to said unit at a point spaced from said center of rotation for elastically restraining rocking of said unit and biasing said unit toward a position of normal centered attitude in said body frame.

ARTHUR M. YOUNG.
BARTRAM KELLEY.

REFERENCES CITED

The following references are of record in the file of this patent:

UNITED STATES PATENTS

| Number | Name | Date |
|---|---|---|
| 1,491,310 | Perrin | Apr. 22, 1924 |
| 2,175,825 | Browne et al. | Oct. 10, 1939 |
| 2,175,999 | Taylor | Oct. 10, 1939 |
| 2,368,334 | Tyler | Jan. 30, 1945 |
| 2,393,141 | Butterfield et al. | Jan. 15, 1946 |
| 2,395,143 | Prewitt | Feb. 19, 1946 |
| 2,418,407 | Hays | Apr. 1, 1947 |
| 2,457,340 | Berry | Dec. 28, 1948 |